United States Patent
Kahle et al.

(10) Patent No.: US 10,094,662 B1
(45) Date of Patent: Oct. 9, 2018

(54) THREE-DIMENSION POSITION AND HEADING SOLUTION

(71) Applicant: Trimble Inc., Sunnyvale, CA (US)

(72) Inventors: Kent Wayne Kahle, Hayward, CA (US); Kurtis Maynard, Gainesville, GA (US); Paul Y. Montgomery, Menlo Park, CA (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 15/471,718

(22) Filed: Mar. 28, 2017

(51) Int. Cl.
*G01C 15/00* (2006.01)
*G06T 7/70* (2017.01)
*G01B 11/00* (2006.01)
*G01S 17/42* (2006.01)

(52) U.S. Cl.
CPC .......... *G01C 15/002* (2013.01); *G01B 11/002* (2013.01); *G06T 7/70* (2017.01); *G01S 17/42* (2013.01); *G06T 2207/10004* (2013.01); *G06T 2207/10028* (2013.01); *G06T 2207/30252* (2013.01)

(58) Field of Classification Search
CPC ................. G01C 15/002; G06T 7/70; G06T 2207/10028; G06T 2207/30252; G06T 2207/10004; G01B 11/002; G01S 17/422
See application file for complete search history.

(56) References Cited

U.S. PATENT DOCUMENTS

| | | | |
|---|---|---|---|
| 2,685,082 A | 7/1954 | Beman et al. | |
| 2,966,090 A | 12/1960 | Schöldström | |
| 5,926,260 A | 7/1999 | Dunne et al. | |
| 6,064,398 A | 5/2000 | Ellenby et al. | |
| 6,097,429 A | 8/2000 | Seeley et al. | |
| 6,421,627 B1 | 7/2002 | Ericsson | |
| 6,697,147 B2 | 2/2004 | Ko et al. | |
| 6,919,880 B2 | 7/2005 | Morrison et al. | |
| 7,215,364 B2 | 5/2007 | Wachtel et al. | |
| 8,350,908 B2 | 1/2013 | Morris et al. | |
| 8,874,406 B2 | 10/2014 | Røtvold et al. | |
| 2006/0174302 A1 | 8/2006 | Mattern et al. | |
| 2006/0271298 A1 | 11/2006 | MacIntosh et al. | |

(Continued)

FOREIGN PATENT DOCUMENTS

| | | |
|---|---|---|
| EP | 0 956 397 A1 | 11/1999 |
| EP | 2 116 919 A1 | 11/2009 |

(Continued)

OTHER PUBLICATIONS

Invitation to Pay Additional Fees for International Application No. PCT/US2018/024056, dated Jun. 11, 2018, 21 pages.

(Continued)

*Primary Examiner* — Michael J Zanelli
(74) *Attorney, Agent, or Firm* — Kilpatrick Townsend & Stockton LLP

(57) ABSTRACT

Systems and methods for determining orientation and three-dimensional position of construction equipment are presented. An orientation device is mounted to a machine. The orientation device has an image sensor. The orientation device measures an offset between a direction of the orientation device and a reference at a known location. The heading of the machine is calculated based on the offset and the known location of the reference.

20 Claims, 8 Drawing Sheets

(56) References Cited

U.S. PATENT DOCUMENTS

| | | |
|---|---|---|
| 2007/0107240 A1* | 5/2007 | Piekutowski ......... E01C 19/006 |
| | | 33/286 |
| 2007/0177133 A1 | 8/2007 | Cain et al. |
| 2008/0211915 A1 | 9/2008 | McCubbrey |
| 2008/0240616 A1 | 10/2008 | Haering et al. |
| 2008/0244920 A1 | 10/2008 | Stegmaier |
| 2010/0183422 A1 | 7/2010 | Mäkelä et al. |
| 2011/0115909 A1 | 5/2011 | Sternberg et al. |
| 2012/0105821 A1* | 5/2012 | Moser ................... G01S 17/023 |
| | | 356/3.09 |
| 2012/0303336 A1 | 11/2012 | Becker et al. |
| 2013/0278758 A1* | 10/2013 | Von Matern ............ G01S 5/163 |
| | | 348/135 |
| 2014/0218612 A1 | 8/2014 | Belsarkar |
| 2014/0267685 A1 | 9/2014 | Kahle et al. |
| 2014/0300886 A1* | 10/2014 | Zogg ................... G01C 15/002 |
| | | 356/4.01 |

FOREIGN PATENT DOCUMENTS

| | | |
|---|---|---|
| FR | 2 630 538 A1 | 10/1989 |
| WO | 2010/0148526 A1 | 12/2010 |

OTHER PUBLICATIONS

International Search Report and Written Opinion for Application No. PCT/US2018/024056, dated Aug. 1, 2018, 25 pages.

* cited by examiner

THREE-DIMENSION POSITION AND HEADING SOLUTION

BACKGROUND

This disclosure relates in general to surveying systems and, but not by way of limitation, to determining spatial relationships between different positions. A theodolite is a surveying instrument used in surveying building construction and is used to measures angles for two degrees of freedom. A total station (sometimes referred to as a total station theodolite (TST)) is an electronic theodolite integrated with an electronic distance meter (EDM). The EDM measures a distance from a particular point to the EDM. Surveying allows land and structures to be accurately measured.

Global navigation satellite systems (GNSS), such as the Global Positioning System (GPS), can provide accurate positioning. For example, two GPS receivers are placed on two ends of a blade of a bulldozer to provide accurate three-dimension (3D) grade control for bulk earthwork, grading, and/or finish grading using the bulldozer. An example of a commercial system for 3D grade control is Trimble's GCS900 with GradeMax Plus.

BRIEF SUMMARY

Though systems using two GPS receivers can provide 3D position information and orientation of a machine at a construction site, using two GPS receivers can be cost prohibitive in some situations. For example, sometimes two GPS receivers are used on large pieces of equipment (e.g., equipment weighing between 5.5 tons and 25 tons, or more). But using two GPS receivers on smaller pieces of equipment (e.g., equipment weighting between 0.5 and 5.5 tons, such as a skid loader, a mini-excavator, or a fork lift) may be cost prohibited. Some methods exist that use one GPS unit to estimate heading (e.g., of a car) by using history data of previous positions. However, with a machine that can pivot (e.g., around a vertical axis, such as a mini-excavator), it does not necessarily follow that history data of previous positions of one GPS receiver will provide accurate information for the current heading of the machine. Further, some GPS solutions don't work in some situations (e.g., indoors).

Smaller pieces of equipment are widely used on construction sites to perform tasks. Tasks performed by smaller pieces of equipment could be improved with more accurate 3D position and heading information (e.g., to help a less-experienced operator of a mini excavator dig a straighter ditch with more accurate starting and ending points). As a distance between two GPS antennas gets shorter, accuracy degrades. Thus on smaller machines (e.g., a mini excavators) a distance between two GPS antennas would be much shorter than a distance between GPS antennas on a large blade of a bulldozer. Thus there is a need for accurate and/or less expensive systems and methods for determining a 3D position and heading of a piece of equipment at a construction site.

One general aspect includes a system for determining 3D position and heading of construction equipment, the system including a machine for use at a construction site. The machine is movable so as to have a first degree of freedom, a second degree of freedom, a third degree of freedom, and a fourth degree of freedom. The first degree of freedom, the second degree of freedom, and the third degree of freedom correspond to a position of the machine, in three dimensions. The fourth degree of freedom corresponds to a heading of the machine. The system also includes a retroreflector coupled with the machine. The system also includes a robotic total station, configured to track the retroreflector and determine the position of the retroreflector in three dimensions. The system also includes an orientation device coupled with the machine. The orientation device includes an image sensor and electronics. The electronics are configured to determine the position of the machine in three dimensions using data from the robotic total station and determine a coordinate of a reference imaged on the image sensor, where the reference is at a known location. The system calculates the heading of the machine based the coordinate of the reference imaged on the image sensor and the known location of the reference. Other embodiments of this aspect include corresponding computer systems, apparatus, and computer programs recorded on one or more computer storage devices, each configured to perform the actions of the methods.

Implementations may include one or more of the following features. The system as recited where the reference is a light source. The system as recited where the light source is coupled with the robotic total station. The system as recited where the light source is a laser or an infrared light. The system as recited where the orientation device includes a plurality of cameras and the image sensor is one of many image sensors. The system as recited where the plurality of cameras provide a combined 360 degree field of view. The system as recited where the orientation device includes a stator and/or a rotor. The system may also include a motor to move the rotor in relation to the stator. The system may also include an angle sensor to measure an offset between the stator and the rotor. In some embodiments, the heading is calculated based on the offset between the stator and the rotor. The robotic total station uses a first coordinate system and the image sensor uses a second coordinate system. The image sensor is part of a camera. The system may also include the camera has a field of view equal to or less than 20 degrees. The method as recited where the camera is part of a plurality of cameras. The method as recited where the plurality of cameras provide a combined 360 degree field of view. The method as recited where the reference is a light source. The system as recited where the electronics are part of the orientation device. The system as recited where the reference is the robotic total station, an led light ring coupled with the robotic total station, or a fence post. The system as recited where the orientation device includes only one image sensor. The system may also include the image sensor is part of a camera. The system may also include the camera has a field of view equal to or less than 20 degrees. The system as recited where the orientation device further include a stator, a rotor, and a motor to move the rotor in relation to the stator. The system may also include the image sensor is coupled with the rotor. The system may also include the electronics control the motor to move the rotor so that the image sensor tracks the reference. The system as recited further including the machine, where the machine is configured for use at a construction site. The system may also include the machine is movable so as to have a first degree of freedom, a second degree of freedom, a third degree of freedom, and a fourth degree of freedom. The system as recited where: the orientation device includes a plurality of cameras and the image sensor is one of many image sensors. The system may also include the plurality of cameras provide a combined 360 degree field of view.

One general aspect includes a method for determining 3d position and heading of construction equipment, the method including determining a position of a machine in three dimensions in a first coordinate system using a total station. The method also includes creating an image of a reference with a camera, where the reference is at a known location in the first coordinate system. The method also includes determining a coordinate of the reference in a field of view of the camera in a second coordinate system. The method also includes determining an offset between the coordinate of the reference and a heading of the machine. The method also includes calculating the heading of the machine in the first coordinate system based on the offset and the known location of the reference.

Implementations may include one or more of the following features. The method as recited where the camera is part of a plurality of cameras. The method as recited where the plurality of cameras provide a combined 360 degree field of view. The method as recited where the reference is a light source. The system as recited where the electronics are part of the orientation device. The system as recited where the reference is the robotic total station, an led light ring coupled with the robotic total station, or a fence post. The system as recited where the orientation device includes only one image sensor. The system may also include the image sensor is part of a camera. The system may also include the camera has a field of view equal to or less than 20 degrees. The system as recited where the orientation device further include a stator, a rotor, and a motor to move the rotor in relation to the stator. The system may also include the image sensor is coupled with the rotor. The system may also include the electronics control the motor to move the rotor so that the image sensor tracks the reference. The system as recited further including the machine, where the machine is configured for use at a construction site. The system as recited where: the orientation device includes a plurality of cameras and the image sensor is one of many image sensors. The system may also include the plurality of cameras provide a combined 360 degree field of view One general aspect includes a system for determining 3D position and heading of construction equipment, the system including a retroreflector for coupling to a machine. The system also includes a robotic total station, configured to track the retroreflector and determine a position of the retroreflector in three dimensions. The system also includes an orientation device for coupling to the machine, where the orientation device includes an image sensor and electronics. The system also includes receiving data from the robotic total station. The system also includes determining the position of the machine in two dimensions or three dimensions using the data from the robotic total station. The system also includes determining a coordinate of a reference imaged on the image sensor, where the reference is at a known location. The system also includes calculate a heading of the machine based the coordinate of the reference imaged on the image sensor and the known location of the reference.

Implementations may include one or more of the following features. The system as recited where the electronics are part of the orientation device. The system as recited where the reference is the robotic total station, an led light ring coupled with the robotic total station, or a fence post. The system as recited where the orientation device includes only one image sensor. The system may also include the image sensor is part of a camera. The system may also include the camera has a field of view equal to or less than 20 degrees. The system as recited where the orientation device further include a stator, a rotor, and a motor to move the rotor in relation to the stator. The system may also include the image sensor is coupled with the rotor. The system may also include the electronics control the motor to move the rotor so that the image sensor tracks the reference. The system as recited further including the machine, where the machine is configured for use at a construction site. The system as recited where the orientation device includes a plurality of cameras and the image sensor is one of many image sensors. The system may also include the plurality of cameras provide a combined 360 degree field of view.

Other embodiments include corresponding computer systems, apparatus, and computer programs recorded on one or more computer storage devices, each configured to perform the actions of the methods. Implementations of the described techniques may include hardware, a method or process, or computer software on a computer-accessible medium.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

FIG. 1 depicts an embodiment of a system used for determining 3D position and heading of construction equipment.

Figure 2A:
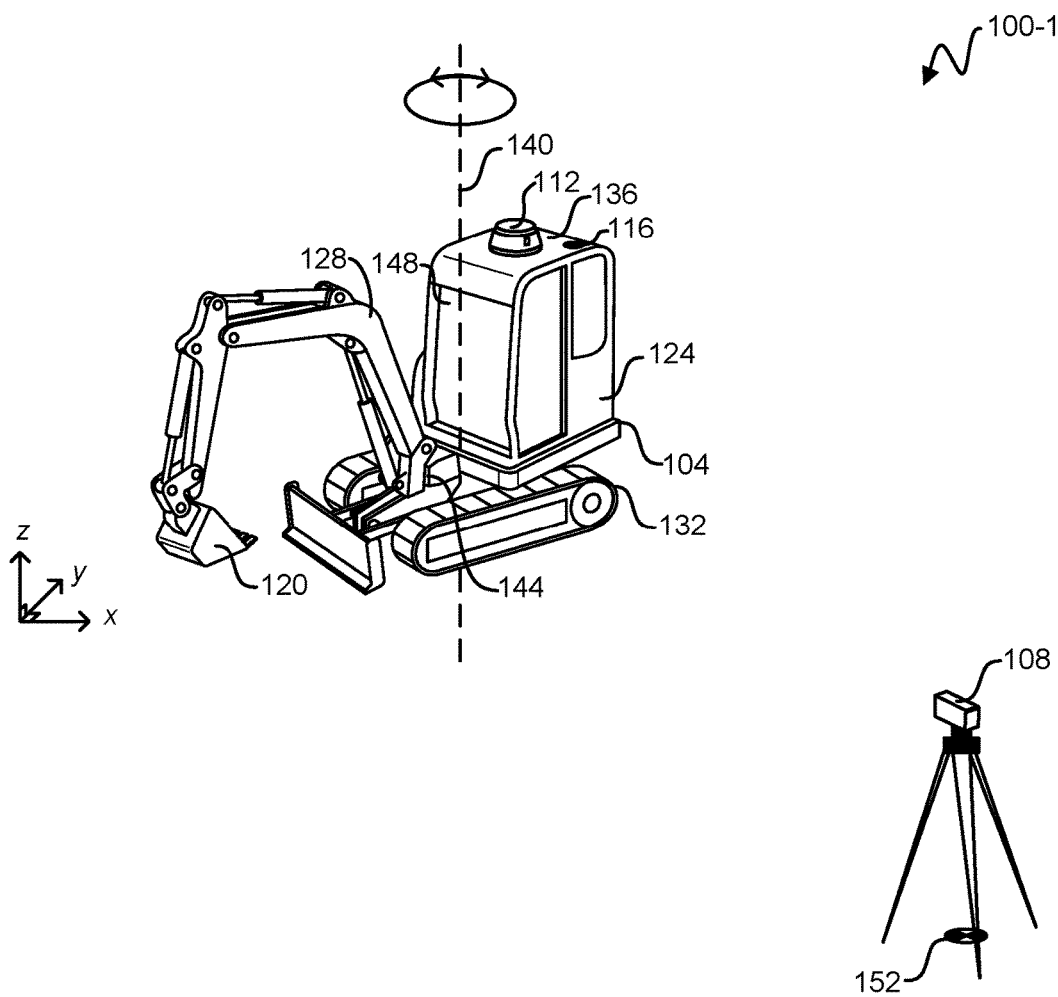
FIG. 2A depicts an embodiment of an orientation device.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiments only, and is not intended to limit the scope, applicability, or configuration of the disclosure. Rather, the ensuing description of the preferred exemplary embodiments will provide those skilled in the art with an enabling description for implementing a preferred exemplary embodiment. It is understood that various changes may be made in the function and arrangement of elements without departing from the spirit and scope as set forth in the appended claims.

An orientation device is placed on a machine (e.g., a piece of earth-moving equipment at a construction site, such as a min-excavator). The orientation device provides heading information of the machine.

Referring first to FIG. 1, an embodiment of a first system 100 for determining 3D position and heading of construction equipment is shown. The system comprises a machine 104, a laser system 108, a first orientation device 112, and a GNSS receiver 116.

The machine 104 shown is a mini-excavator having a bucket 120, a cab 124, and a stick 128 coupling the bucket 120 with the cab 124. The mini-excavator further comprises tread 132. A first joint allows the cab 124 to pivot about a vertical axis 140 with respect to the tread 132. A second joint 144 couples the stick 128 to the cab 124.

The machine 104 is movable so as to have a first degree of freedom, a second degree of freedom, a third degree of freedom, and a fourth degree of freedom. The first degree of freedom, the second degree of freedom, and the third degree of freedom correspond to a position of the machine, in three dimensions. For example, the machine 104 is able to change its position at a construction site by moving around the construction site using the tread 132. In some embodiments, the first degree of freedom, the second degree of freedom, and the third degree of freedom correspond to orthogonal axes, x, y, and z, of a Cartesian coordinate system, where the z axis is a vertical axis and the x axis and they axis are in a horizontal plane. The first degree of freedom corresponds to the x axis, the second degree of freedom corresponds to they axis, and the third degree of freedom corresponds to the z axis. The machine 104 is moveable in the third degree of freedom (e.g., the z axis) based on terrain of the construction site (e.g., the machine 104 traveling up or down an incline, such as a hill).

The fourth degree of freedom corresponds to a heading of the machine 104. For example, the heading of the machine could be defined in a direction normal to a front 148 of the cab 124. The front 148 of the cab 124 can rotate in relation to the tread 132 about the first joint. The tread 132 determine a direction of travel of the machine 104. Thus the heading of the machine 104 can be different than a direction of travel of the machine 104.

The laser system 108 is at a known location. For example, the laser system 108 is positioned over a survey mark 152 at a known height. In some embodiments, the laser system 108 is positioned a known distance away from another known location. The laser system 108 emits a laser beam. In some embodiments, the laser beam has a spot size in a shape of a fan. For example the shape of the fan has a greater vertical height than a horizontal width (e.g., the vertical height is 2 times, 10 times, a 100 times, and/or 1000 times more than the horizontal width of the beam at a distance of 10 meters away from the laser system 108).

The GNSS receiver 116 receives signals from satellites to determine a position of the machine 104 in the first dimension, the second dimension, and the third dimension. Though the GNSS receiver 116 is shown coupled with the machine 104, in some embodiments the GNSS receiver 116 is coupled with the laser system 108, is part of a laptop computer, is part of a mobile device, or is a stand-alone system. A mobile device is a computing device having a display screen and is small enough to be handheld (e.g., a smart phone, a smart watch, or a tablet).

The first orientation device 112, in conjunction with the laser system 108, provide information for determining the heading of the machine 104. The first orientation device 112 is coupled with the machine 104 (e.g., secured to a roof 136 of the cab 124 of the machine 104).

Referring next to FIG. 2A, an embodiment of the first orientation device 112 is shown. The first orientation device 112 comprises a stator 204, a rotor 208, a motor, an angle sensor, and a photodiode 212. The motor is used to move the rotor 208 about the stator 204. The angle sensor measures an offset 216 between the stator 204 and the rotor 208. The photodiode 212 is configured to produce an electric signal while irradiated by light from the laser system 108. The photodiode 212 is coupled with the rotor 208. The offset 216 is determined, e.g., by digital and/or analog electronics by a position of the rotor 208 relative to the stator 204, while the photodiode 212 is irradiated by light from the laser system 108. In some embodiments, electronics control the motor to move the rotor 208 so that the photodiode 212 remains pointed toward the laser system 108 while the machine 104 moves and/or rotates (e.g., lock to the laser system 108 so the photodiode 212 tracks the laser system 108). In some embodiments, the motor continuously moves the rotor 208 (e.g., at a constant angular speed) and measurements of the offset 216 are taken while the photodiode 212, which is spinning around the stator 204, is irradiated by light from the laser system 108.

Figure 2B:
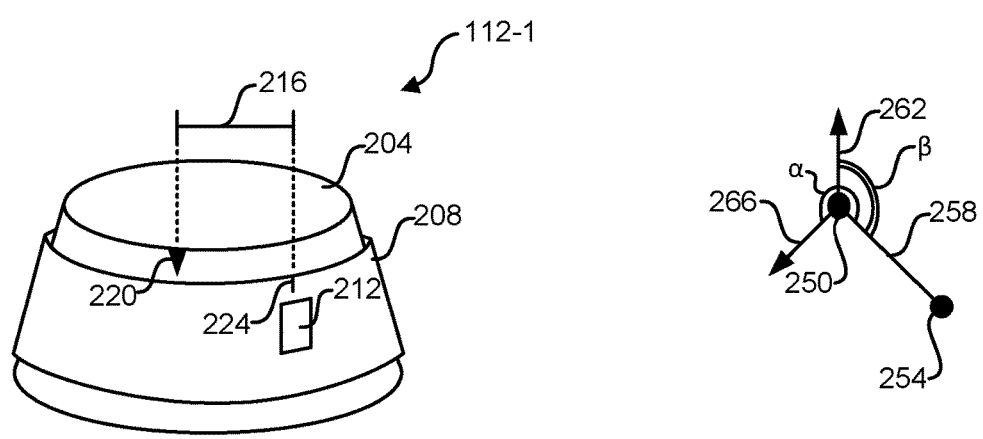
FIG. 2B depicts a simplified diagram of an embodiment of using the offset to calculate the heading in the coordinate system.

FIG. 2B shows a simplified diagram of an embodiment of using the offset 216 to calculate the heading in the coordinate system. FIG. 2B is a top view. FIG. 2B shows a position 250 of the machine 104 and a position 254 of the survey mark 152. A baseline 258 is a line between the position 250 of the machine 104 and the position 254 of the survey mark 152. A north 262 direction is shown. A heading 266 of the machine 104 is shown. A first angle, $\alpha$, is measured as the offset 216 (e.g., an angle between the heading 266 and the baseline 258). A second angle, $\beta$, is an angle measured in the coordinate system between north 262 and the baseline 258 (e.g., measured in the coordinate system of the GNSS receiver or a total station). The heading 266 of the machine 104 is measured in degrees in the coordinate system by: heading=360−$\alpha$+$\beta$.

For example, the stator 204 has a first mark 220, and the rotor 208 has a second mark 224. The first orientation device 112 is coupled with the machine 104 so that the first mark 220, of the stator 204, is aligned with the heading of the machine 104 (e.g., aligned to point toward the front 148 of the machine 104). The GNSS receiver 116 provides the position 250 of the machine 104 in three dimensions (or two dimensions) of a coordinate system (in some embodiments, the position of the machine 104 is determined by a total station). The survey mark 152 is a known position (the position 254 of the survey mark 152) in the coordinate system, which provides accuracy in determining the known position of the laser system 108. The position of the machine 104 in the coordinate system and the known position of the laser system 108 in the coordinate system provide the baseline 258 in the coordinate system from which to determine the heading 266 of the machine by knowing the offset 216. In some embodiments, the heading is determined in two dimensions, not three (e.g., in the x/y plane). In an example, in the coordinate system of the GNSS receiver 116, the laser system 108 is located at a 130 degree angle from the machine 104 (0 degrees being north; in the y direction in FIG. 1), so that β=130 degrees. And the angle sensor measures an offset 216 of 280 degrees, so that α=280 degrees. Then the heading 266 of the machine 104 in the coordinate system of the GNSS receiver would be 360-280+ 130=210 degrees. In some embodiments, an orientation device (e.g., the first orientation device 112) is used because it is more accurate than a digital compass.

In some embodiments, the GNSS receiver 116 is not used. In some embodiments, the laser system 108 is incorporated into a total station. In some embodiments, the heading is determined in a coordinate system of the total station. In some embodiments, a laser used for an EDM of the total station is used as the laser system 108. In some embodiments, a retroreflector is coupled with the machine 104 (e.g., directly coupled or attached to the first orientation device 112, which is attached to the machine 104). The total station can track the machine 104 using the retroreflector. In some embodiments, the laser system 108 is separate from a laser of the total station (in some embodiments, the laser system 108, though different from the EDM laser of the total station, is coupled with the total station). In some embodiments, a laser beam has a spot size that is round. In some embodiments, the laser beam has a spot size where the vertical height is equal or nearly equal the horizontal width, wherein nearly equal is equal to or less than +/−2%, 5%, or 10%. In some embodiments, a round spot size is used for longer range. In some embodiments, a laser having a round beam profile is mounted to a device similar to a total station to move the laser.

Figure 3:
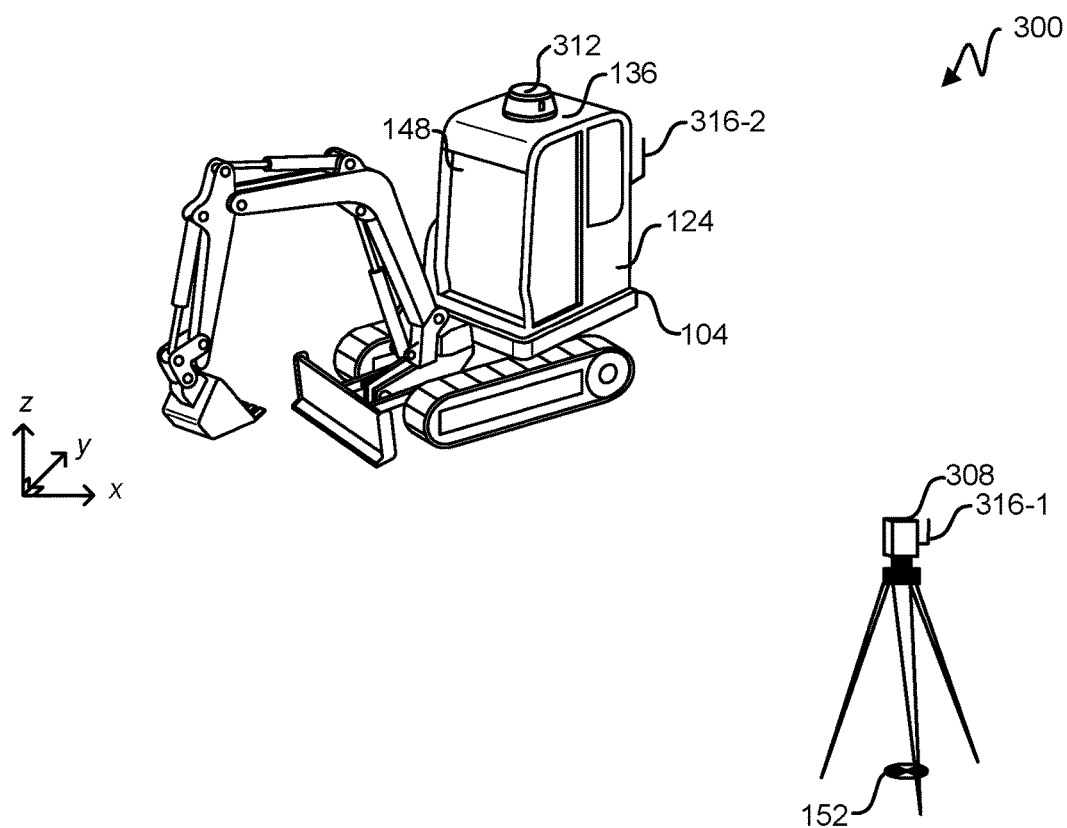
FIG. 3 depicts another embodiment of a system used for determining 3D position and heading of construction equipment.

FIG. 3 depicts an embodiment of a second system 300 for determining 3D position and heading of construction equipment. The second system 300 comprises a machine 104 (similar to FIG. 1), a total station 308, and a second orientation device 312.

The total station 308 is at a known location. For example, the total station 308 is positioned over the survey mark 152 at a known height. In some embodiments, the total station 308 is positioned a known distance away from another known position. In some embodiments, the total station 308 is a robotic total station (e.g., can be used to automatically track an object). The total station 308 tracks the machine 104. For example, a retroreflector is coupled with the machine 104, and the total station 308 tracks the retroreflector. The total station 308 determines the position of the machine in three dimensions (e.g., the first dimension, the second dimension, and the third dimension). In some embodiments, the total station 308 determines the position of the machine 104 in spherical coordinates in a first coordinate system, of the total station, and then converted the position of the machine 104 to a second coordinate system, such a Cartesian coordinate system using x, y, and z. In some embodiments, a position of the total station is determined using a GNSS receiver.

Figure 4:
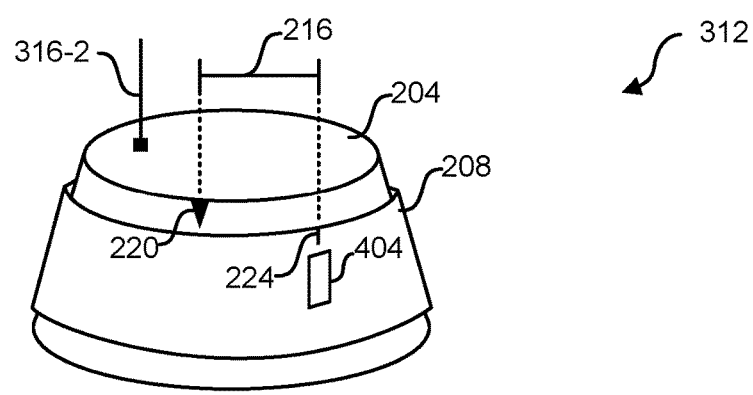
FIG. 4 depicts another embodiment of an orientation device.

FIG. 4 depicts an embodiment of the second orientation device 312. The second orientation device 312 comprises a stator 204, a rotor 208, an angle sensor to measure an offset between the stator 204 and the rotor 208, and a camera 404. The camera 404 comprises a detector array. In some embodiments, the camera 404 comprises a lens and/or a lens system to focus light onto the detector array.

The rotor 208 moves the camera 404 so that the camera 404 can image a reference using the detector array. In the embodiment shown in FIG. 3, the total station 308 is used as the reference. In some embodiments, a reference, other than the total station 308 is used. For example, a fence post, a corner of a building, or a target (e.g., a printed target posted on a wall, or an active target such as a pattern of LED lights) could be used as the reference.

The offset 216 between the stator 204 and the rotor 208 is measured while the camera 404 images the reference (e.g., while the camera 404 images the total station 308). The heading of the machine 104 is determined based on the offset 216 and the known location of the reference.

In some embodiments, the camera 404 has a narrow field of view (e.g., an angle of view equal to or less than twenty, fifteen, ten, five, or two degrees). In some embodiments, a narrow field of view is used to increase an imaging range of the camera. In some embodiments, the camera 404 has a wider field of view (e.g., a field of view between 20 and 80 degrees, such as 20, 40, or 50 degrees). In some embodiments, electronics are configured to move the rotor 208 so that the reference is centered in the field of view of the camera 404. In some embodiments, the camera 404 tracks the reference.

The total station 308 comprises a first antenna 316-1. The machine 104 comprises a second antenna 316-2. The total station 308 uses the first antenna 316-1 to transmit position data to the second antenna 316-2. In some embodiments, the antenna 316 is an internal antenna. In some embodiments, the second antenna 316-2 is an antenna in a mobile device and not physically coupled with the machine 104. In some embodiments, the second antenna 316-2 is connected to the second orientation device 312.

Figure 5:
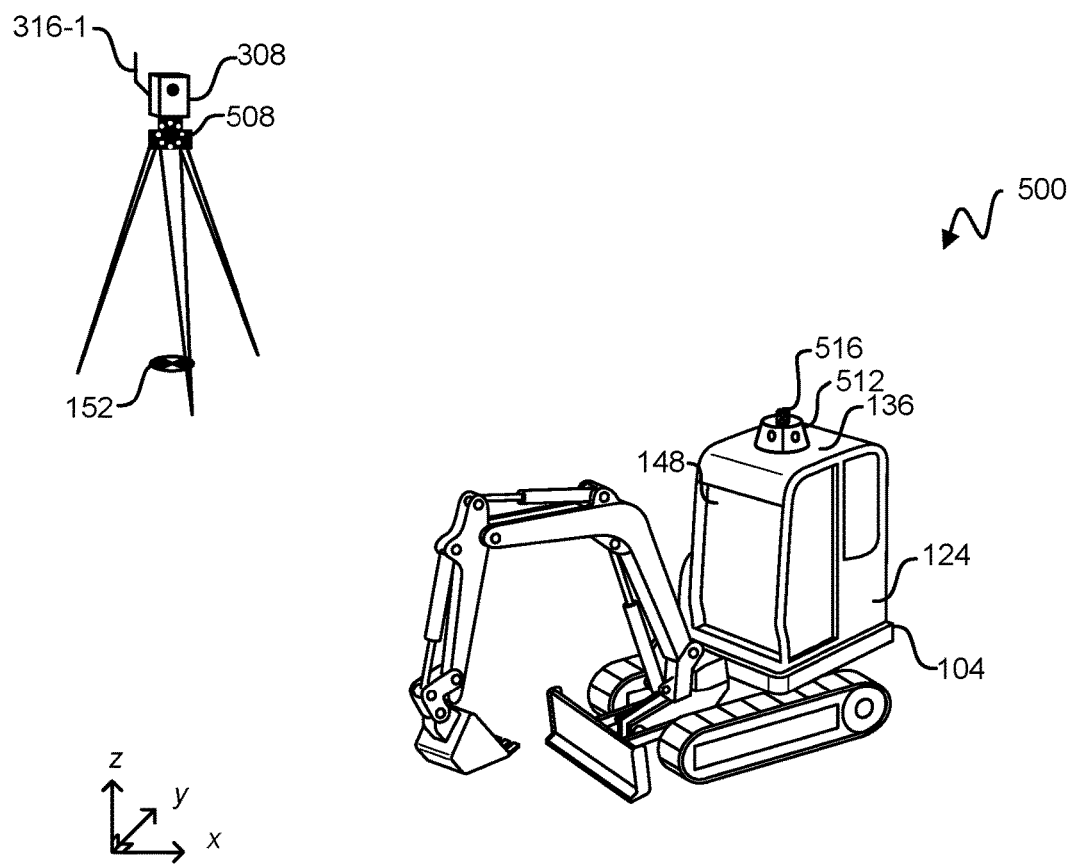
FIG. 5 depicts a further embodiment of a system used for determining 3D position and heading of construction equipment.

FIG. 5 depicts an embodiment of a third system 500 for determining 3D position and heading of construction equipment. The third system 500 comprises a machine 104 (similar to FIG. 1), a total station 308, a light source 508, and a third orientation device 512.

The total station 308 is at a known location. For example, the total station 308 is positioned over the survey mark 152 at a known height. In some embodiments, the total station 308 is positioned a known distance away from another known position. The total station 308 tracks the machine 104. For example, a retroreflector 516 is coupled with the machine 104 (e.g., as part of the third orientation device 512). The total station 308 determines the position of the machine 104 in three dimensions (e.g., the first dimension, the second dimension, and the third dimension). In some embodiments, the total station 308 determines the position of the machine 104 in spherical coordinates in a first coordinate system, of the total station 308, and then converts the position of the machine 104 to a second coordinate system, such a Cartesian coordinate system using x, y, and z.

In some embodiments, the light source 508 is coupled with the total station 308. In some embodiments, the light source 508 is part of the total station 308 (e.g., a light or laser of the total station 308). In some embodiments, the light source 508 is a ring of LEDs (light emitting diodes).

Figure 6:
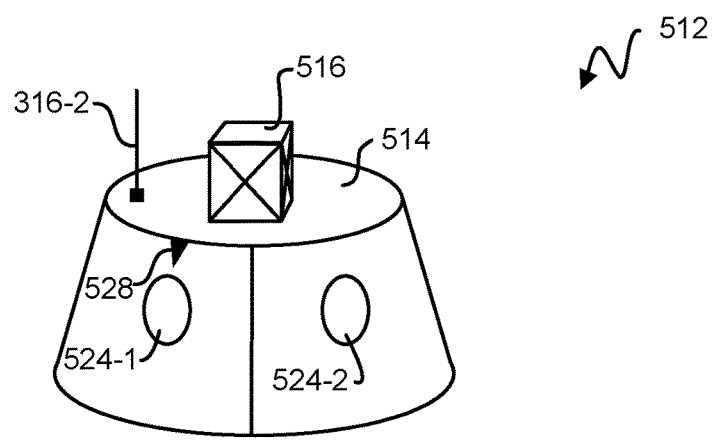
FIG. 6 depicts a further embodiment of an orientation device.

FIG. 6 depicts an embodiment of the third orientation device 512. The third orientation device 512 comprises a base 514 and a plurality of cameras 524. Each of the plurality of cameras 524 comprises a image sensor (e.g., a complementary metal-oxide-semiconductor (CMOS) sensor or charge-coupled device (CCD) sensor). In some embodiments, the third orientation device 512 comprises the retroreflector 516.

The plurality of cameras 524 comprises a first camera 521-1 and a second camera 524-2. The plurality of cameras 524 are positioned on the base 514 so as to have a combined field of view of 360 degrees (e.g., 360 degree view in the x/y plane). Electronics are configured to determine a coordinate of the light source 508 imaged on the a photodetector. Based on the coordinate of the light source on an image sensor, the electronics can determine an offset between the light source 508 and the heading of the machine 104.

For example, the third orientation device 512 comprises a mark 528. The third orientation device 512 is placed on the machine 104 so that the mark 528 aligns with the front 148 of the cab 124 (i.e., so that the mark 528 aligns with the heading of the machine 104). The cameras 524 each have a field of view. An orientation of the field of view of each camera 524 is known in relation to the mark 528. The heading of the machine 104 can be calculated by determining which camera 524 images the light source 508 on an image sensor, and where on the image sensor the light source 508 is imaged to. A coordinate of the image sensor indicates a position on the image sensor. Thus if the coordinate of the light source 508 is determined, then the heading of the machine 504 can be calculated based on the coordinate of the light source 508 on the image sensor of a camera 524, the known position of the light source 508, and the relationship between the field of view of the camera 524, which imaged the light source 508, and the mark 528.

In some embodiments, the third orientation device 512 comprises an antenna 316 to receive data (e.g., position data) from the total station 308.

The offset 216 between the stator 204 and the rotor 208 is measured while the camera 404 images the reference (e.g., the camera 404 images the total station 308). The heading of the machine 104 is determined based on the offset 216 and the known location of the reference.

Figure 7:
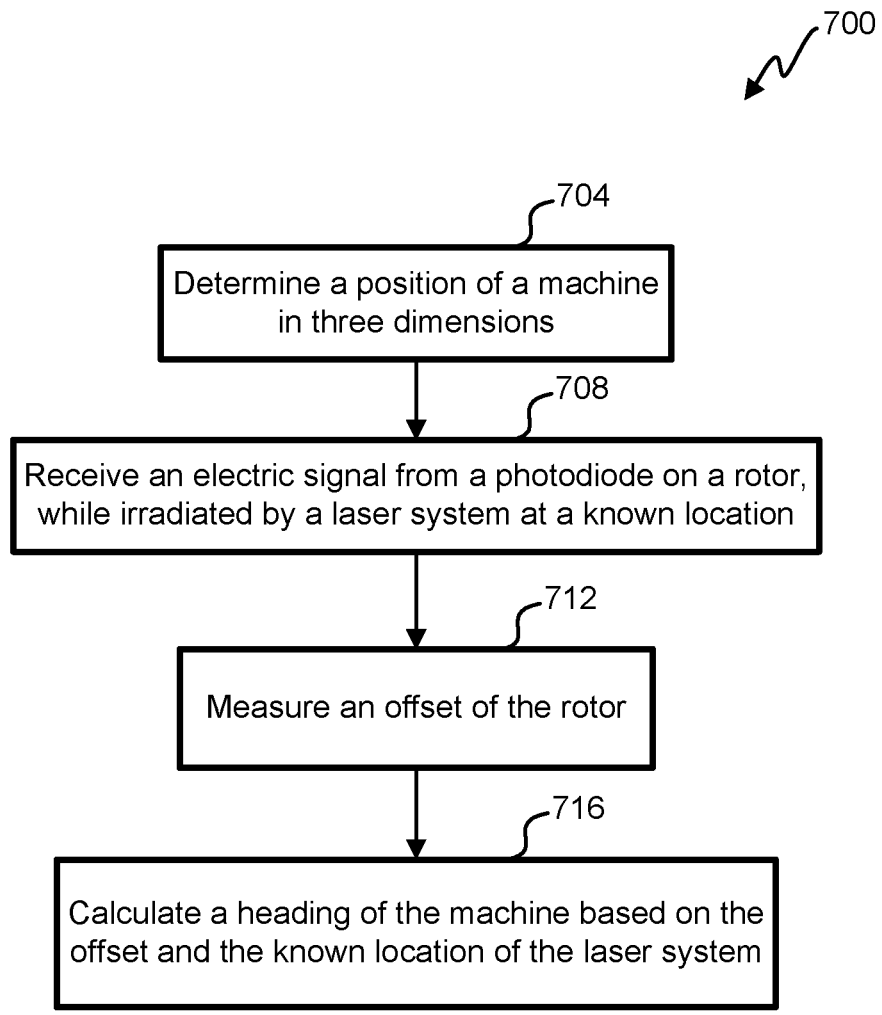
FIG. 7 illustrates a flowchart of an embodiment of a process for determining 3D position and heading of construction equipment.

Referring next to FIG. 7, a flowchart of an embodiment of a process 700 for determining 3D position and heading of construction equipment is shown. The process 700 begins in step 704 with determining a position of a machine 104 in three dimensions. Determining the position of the machine 104 in three dimensions could be done using a GNSS receiver 116 and/or a total station 308. Determining the position of the machine 104 in three dimensions is done in a coordinate system.

In step 708, an electric signal is received from a photodiode 212. The photodiode 212 is on a rotor 208. The rotor 208 is configured to move about a stator 204. The electric signal is produced while the photodiode is irradiated by light from a laser (e.g., laser system 108 or a laser on a total station 308). The laser system is at a known location.

An offset 216 of the rotor is measured, step 712. The offset 216 is measured at a time the electrical signal is produced by the photodiode 212 (e.g., within 10, 5, 3, or 1 second(s) of when the photodiode 212 produces the electrical signal). In some embodiments, the offset 216 is measured between a first mark 220, which is on the stator 204, and a second mark 224, which is on the rotor 208.

In step 716, the heading of the machine 104 is calculated, in the coordinate system, based on the offset 216 and the known location of the laser.

Figure 8:
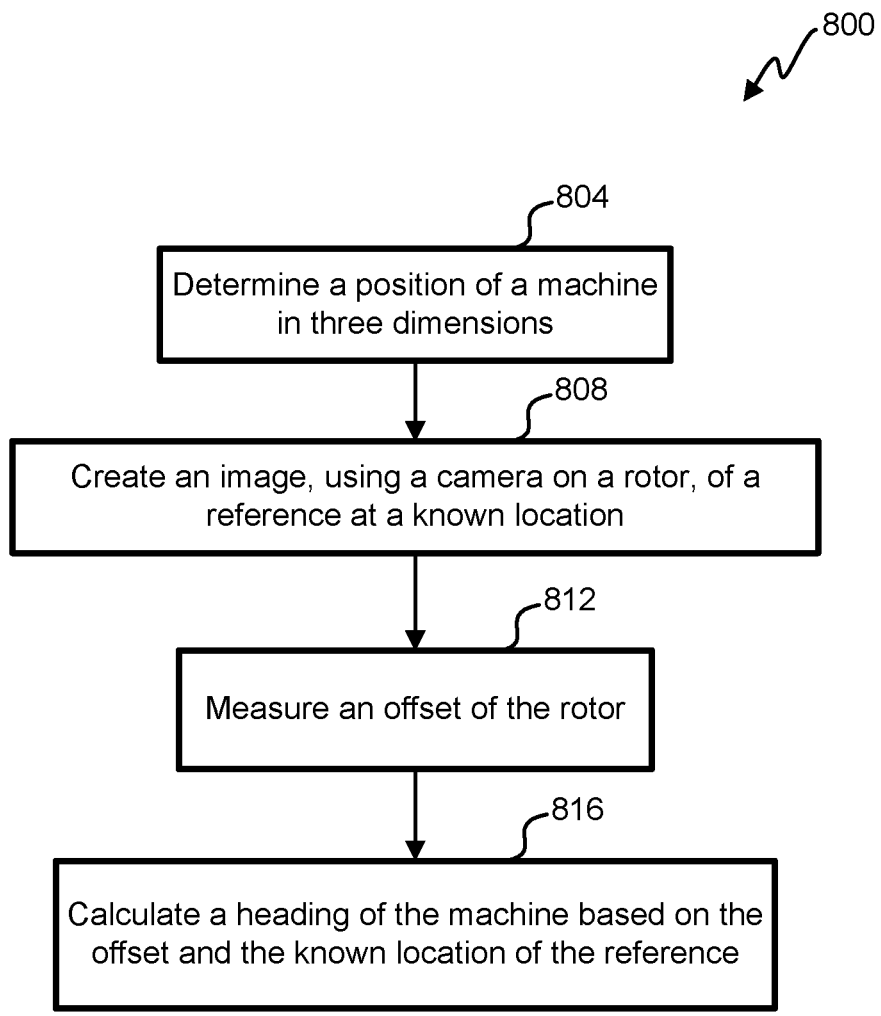
FIG. 8 illustrates a flowchart of another embodiment of a process for determining 3D position and heading of construction equipment.

FIG. 8 illustrates a flowchart of another embodiment of a process 800 for determining 3D position and heading of construction equipment. The process 800 begins in step 804 with determining a position of a machine 104 in three dimensions. Determining the position of the machine 104 in three dimensions could be done using a GNSS receiver 116 and/or a total station 308. Determining the position of the machine 104 in three dimensions is done in a coordinate system.

In step 808, an image of a reference is created using the camera 404. The reference is at a known location in the coordinate system. In some embodiments, the reference is the total station 308. In some embodiments, the reference is a post or the light source 508. In some embodiments, the method further comprises determining the known location in the first coordinate system (e.g., in two and/or three dimensions).

The camera 404 is on a rotor 208. In step 812, an offset 216 of the rotor 208 is measured. The offset 216 is measured at a time the image of the reference is created by the camera 404 (e.g., within 10, 5, 3, or 1 second(s) of when the camera 404 images the reference). In some embodiments, the offset 216 is measured between a first mark 220, which is on the stator 204, and a second mark 224, which is on the rotor 208.

In step 816, the heading of the machine 104 is calculated, in the coordinate system, based on the offset and the known location of the reference.

Figure 9:
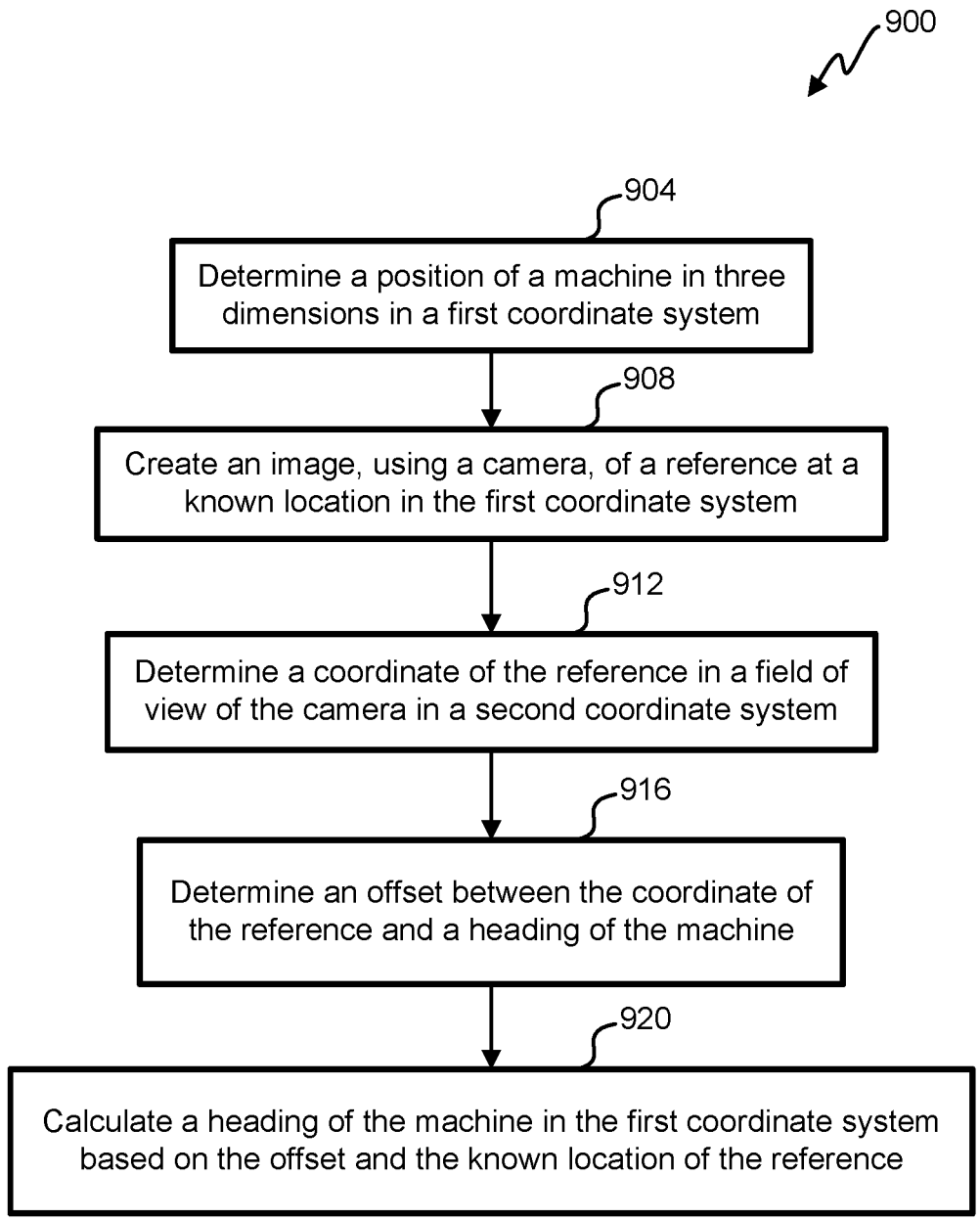
FIG. 9 illustrates a flowchart of a further embodiment of a process for determining 3D position and heading of construction equipment.

FIG. 9 illustrates a flowchart of a further embodiment of a process 900 for determining 3D position and heading of construction equipment. The process 900 begins in step 904 with determining a position of a machine 104 in three dimensions. Determining the position of the machine 104 in three dimensions could be done using a GNSS receiver 116 and/or a total station 308. Determining the position of the machine 104 in three dimensions is done in a first coordinate system.

In step 908, an image of a reference is created using a camera 524. The camera 524 is one of a plurality of cameras. The plurality of cameras are fixed in relation to each other and/or in relation to a heading of the machine 104. The reference is at a known location in the first coordinate system. In some embodiments, the reference is the total station 308. In some embodiments, the reference is a post, the light source 508, or other object.

In step 912, coordinates of the reference are determined. The coordinates of the reference are determined in a second coordinate system. For example, the second coordinate system is a coordinate system of the third orientation device 512. The reference is in a field of view of the camera. For example, the second camera 524-2 images the reference in a field of view of the second camera 524-2.

In step 916, an offset is determined between the coordinate of the reference and the heading of the machine 104 in the second coordinate system. In the second coordinate system, coordinates of the image in a field of view of a camera 524 are mapped in relation to a direction the mark 528 of the third orientation device 512 points. The third orientation device 512 is placed on the machine 104 so that the mark 528 of the third orientation device 512 points in a direction of the heading of the machine (e.g., the mark 528 is centered in relation to and/or points to the front 148 of the machine 104).

In step 920, the heading of the machine 104 is calculated in the first coordinate system based on the offset determined in the second coordinate system and the known location of the reference in the first coordinate system.

Figure 10:
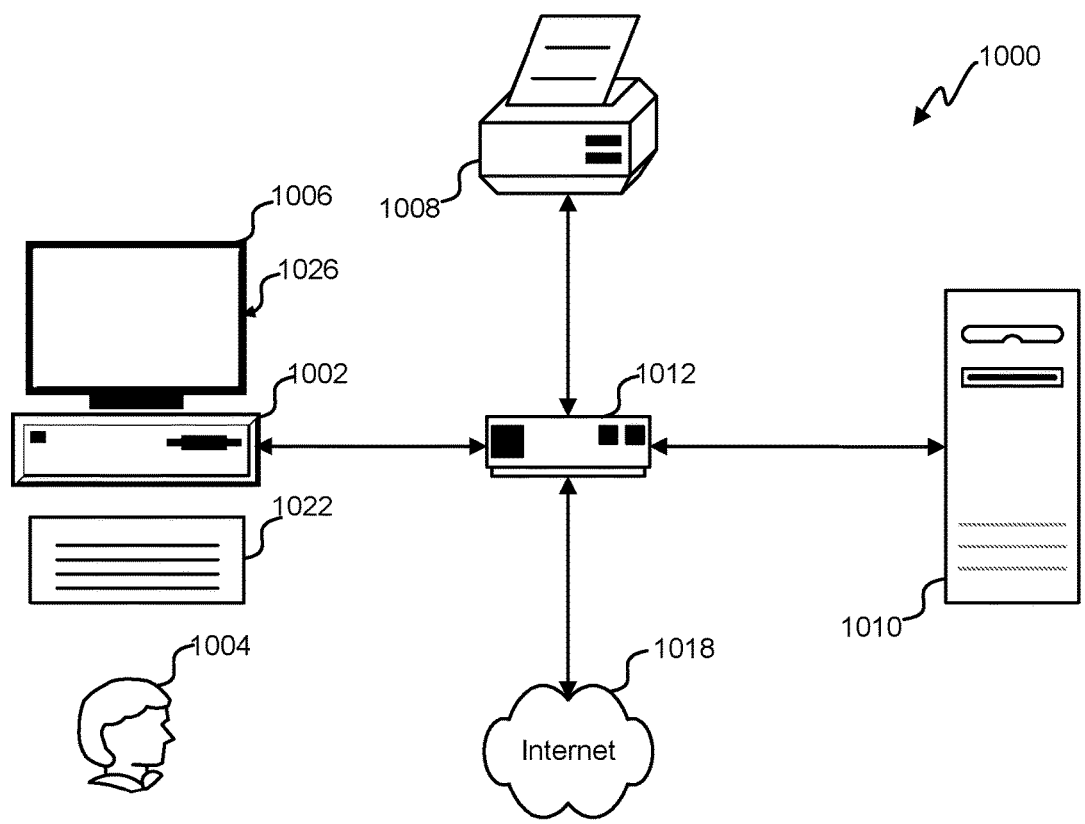
FIG. 10 depicts a block diagram of an embodiment of a computer system.

Referring next to FIG. 10, an exemplary environment with which embodiments may be implemented is shown with a computer system 1000 that can be used by a designer 1004 to design, for example, electronic designs. The computer system 1000 can include a computer 1002, keyboard 1022, a network router 1012, a printer 1008, and a monitor 1006. The monitor 1006, processor 1002 and keyboard 1022 are part of a computer system, which can be a laptop computer, desktop computer, handheld computer, mainframe computer, etc. The monitor 1006 can be a CRT, flat screen, etc.

A designer 1004 can input commands into the computer 1002 using various input devices, such as a mouse, keyboard 1022, track ball, touch screen, etc. If the computer system 1000 comprises a mainframe, a designer 1004 can access the computer 1002 using, for example, a terminal or terminal interface. Additionally, the computer 1002 may be connected to a printer 1008 and a server 1010 using a network router 1012, which may connect to the Internet 1018 or a WAN (Wide Area Network).

The server 1010 may, for example, be used to store additional software programs and data. In one embodiment, software implementing the systems and methods described herein can be stored on a storage medium in the server 1010. Thus, the software can be run from the storage medium in the server 1010. In another embodiment, software implementing the systems and methods described herein can be stored on a storage medium in the computer 1002. Thus, the software can be run from the storage medium in the computer 1002. Therefore, in this embodiment, the software can be used whether or not computer 1002 is connected to network router 1012. Printer 1008 may be connected directly to computer 1002, in which case, the computer system 1000 can print whether or not it is connected to network router 1012.

Figure 11:
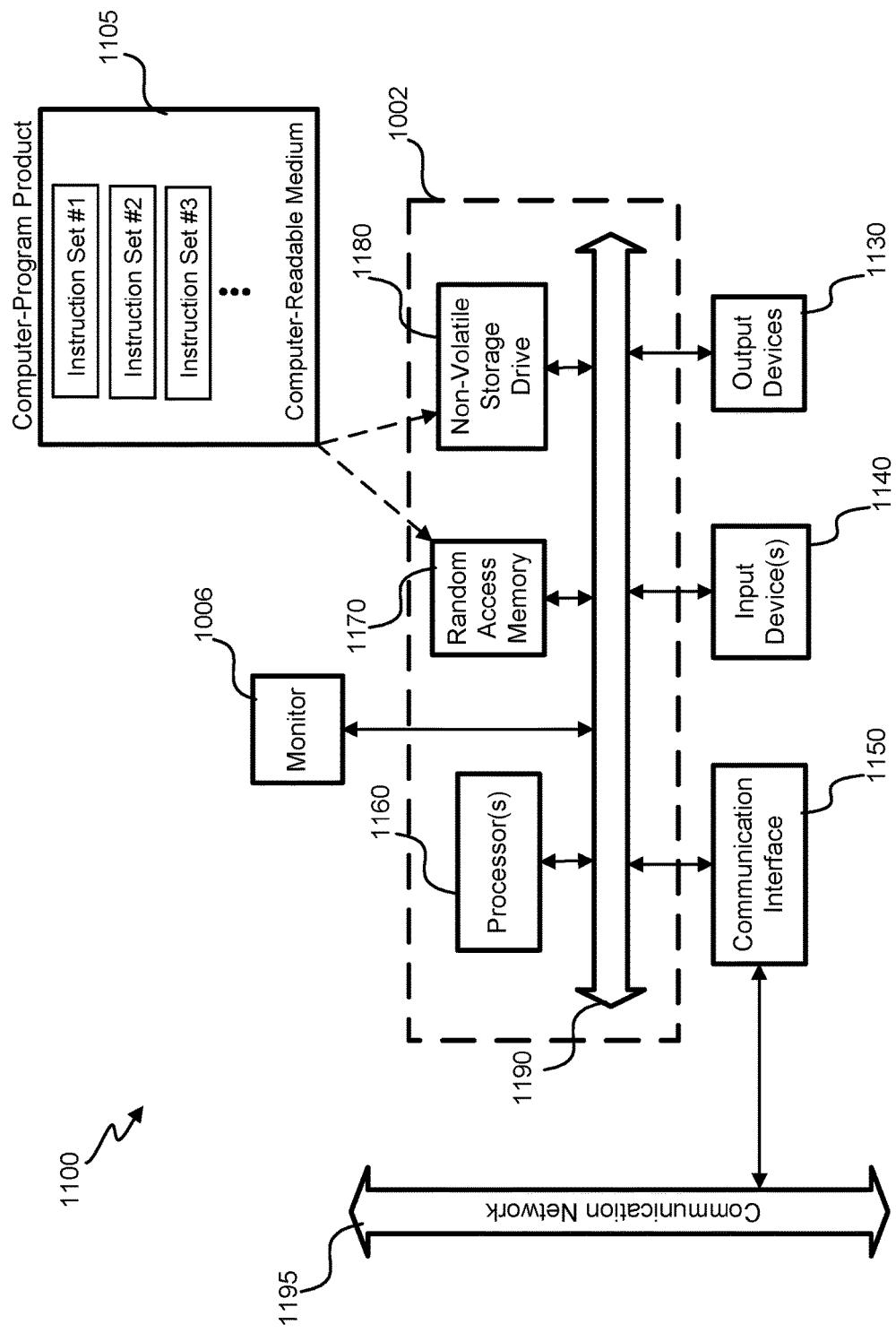
FIG. 11 depicts a block diagram of an embodiment of a special-purpose computer system.

With reference to FIG. 11, an embodiment of a special-purpose computer system 1100 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system, it is transformed into the special-purpose computer system 1100.

Special-purpose computer system 1100 comprises a computer 1002, a monitor 1006 coupled to computer 1002, one or more additional user output devices 1130 (optional) coupled to computer 1002, one or more user input devices 1140 (e.g., keyboard, mouse, track ball, touch screen) coupled to computer 1002, an optional communications interface 1150 coupled to computer 1002, a computer-program product 1105 stored in a tangible computer-readable memory in computer 1002. Computer-program product 1105 directs system 1100 to perform the above-described methods. Computer 1002 may include one or more processors 1160 that communicate with a number of peripheral devices via a bus subsystem 1190. These peripheral devices may include user output device(s) 1130, user input device(s) 1140, communications interface 1150, and a storage subsystem, such as random access memory (RAM) 1170 and non-volatile storage drive 1180 (e.g., disk drive, optical drive, solid state drive), which are forms of tangible computer-readable memory.

Computer-program product 1105 may be stored in non-volatile storage drive 1180 or another computer-readable medium accessible to computer 1002 and loaded into memory 1170. Each processor 1160 may comprise a microprocessor, such as a microprocessor from Intel® or Advanced Micro Devices, Inc.®, or the like. To support computer-program product 1105, the computer 1002 runs an operating system that handles the communications of product 1105 with the above-noted components, as well as the communications between the above-noted components in support of the computer-program product 1105. Exemplary operating systems include Windows® or the like from Microsoft Corporation, Solaris® from Sun Microsystems, LINUX, UNIX, and the like.

User input devices 1140 include all possible types of devices and mechanisms to input information to computer 1002. These may include a keyboard, a keypad, a mouse, a scanner, a digital drawing pad, a touch screen incorporated into the display, audio input devices such as voice recognition systems, microphones, and other types of input devices. In various embodiments, user input devices 1140 are typically embodied as a computer mouse, a trackball, a track pad, a joystick, wireless remote, a drawing tablet, a voice command system. User input devices 1140 typically allow a user to select objects, icons, text and the like that appear on the monitor 1006 via a command such as a click of a button or the like. User output devices 1130 include all possible types of devices and mechanisms to output information from computer 1002. These may include a display (e.g., monitor 1006), printers, non-visual displays such as audio output devices, etc.

Communications interface 1150 provides an interface to other communication networks and devices and may serve as an interface to receive data from and transmit data to other systems, WANs and/or the Internet 1018. Embodiments of communications interface 1150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1150 may be coupled to a computer network, to a FireWire® bus, or the like. In other embodiments, communications interface 1150 may be physically integrated on the motherboard of computer 1002, and/or may be a software program, or the like.

RAM 1170 and non-volatile storage drive 1180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1170 and non-volatile storage drive 1180 may be configured to store the basic programming and data constructs that provide the functionality of various embodiments of the present invention, as described above.

Software instruction sets that provide the functionality of the present invention may be stored in RAM 1170 and non-volatile storage drive 1180. These instruction sets or code may be executed by the processor(s) 1160. RAM 1170 and non-volatile storage drive 1180 may also provide a repository to store data and data structures used in accordance with the present invention. RAM 1170 and non-volatile storage drive 1180 may include a number of memories including a main random access memory (RAM) to store of instructions and data during program execution and a read-only memory (ROM) in which fixed instructions are stored. RAM 1170 and non-volatile storage drive 1180 may include a file storage subsystem providing persistent (non-volatile) storage of program and/or data files. RAM 1170 and non-volatile storage drive 1180 may also include removable storage systems, such as removable flash memory.

Bus subsystem 1190 provides a mechanism to allow the various components and subsystems of computer 1002 communicate with each other as intended. Although bus subsystem 1190 is shown schematically as a single bus, alternative embodiments of the bus subsystem 1190 may utilize multiple busses or communication paths within the computer 1002.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

In some embodiments, a system for determining 3D position and heading of construction equipment, the system comprises: a machine for use at a construction site, wherein: the machine is movable so as to have a first degree of freedom, a second degree of freedom, a third degree of freedom, and a fourth degree of freedom; the first degree of freedom, the second degree of freedom, and the third degree of freedom correspond to a position of the machine, in three dimensions; the fourth degree of freedom corresponds to a heading of the machine; a laser system, wherein the laser system is at a known location; an orientation device, wherein: the orientation device is coupled to the machine; and the orientation device comprises: a stator; a rotor; a motor to move the rotor about the stator; and an angle sensor to measure an offset between the rotor and the stator; and a photodiode coupled to the rotor, wherein the photodiode is configured to produce an electric signal while irradiated by light from the laser system; a GNSS receiver; electronics configured to: determine the position of the machine in three dimensions using the GNSS receiver; determine the offset between the rotor and the stator measured by the angle sensor, wherein the offset is determined by a position of the rotor while the photodiode is irradiated by light from the laser system; and calculate the heading of the machine based on the offset and the known location of the laser system. In some embodiments, the GNSS receiver is coupled with the machine; the GNSS receiver is coupled with the machine by being part of the orientation device; and/or the GNSS receiver is coupled with the laser system. In some embodiments, the system further comprises a total station; the total station comprises a laser; and the laser system is different than the laser of the total station. In some embodiments, the laser system is coupled with the total station; the laser system is part of a total station; and/or the total station is a robotic total station configured to track a retroreflector on the machine. In some embodiments, the laser system produces a beam profile; the beam profile has a height and a width; the height is measured vertically and the width is measured horizontally; and the height is greater than the width. In some embodiments, electronics control the motor to move the rotor so that the photodiode tracks the laser system; the rotor continuously turns about the stator at a constant speed; and/or the photodiode is part of a camera.

In some embodiments, a method for determining 3D position and heading of construction equipment comprises: determining a position of a machine in three dimensions using a GPS receiver; receiving an electrical signal from a photodiode, wherein: the photodiode produces the electric signal while irradiated by light from a laser system; the laser system is at a known location; the photodiode is on a rotor; the rotor is configured to move about a stator; measuring an offset between the stator and the rotor at a time the electrical signal is produced by the photodiode; calculating the heading of the machine based on the offset and the known location of the laser system.

In some embodiments, a system for determining 3D position and heading of construction equipment comprises: a machine for use at a construction site, wherein: the machine is movable so as to have a first degree of freedom, a second degree of freedom, a third degree of freedom, and a fourth degree of freedom; the first degree of freedom, the second degree of freedom, and the third degree of freedom correspond to a position of the machine, in three dimensions; the fourth degree of freedom corresponds to a heading of the machine; a robotic total station, configured to: track the machine; and determine the position of the machine in three dimensions; an orientation device coupled with the machine, the orientation device comprising: a stator; a rotor; a motor to move the rotor about the stator; an angle sensor to measure an offset between the rotor and the stator; a camera coupled with the rotor, wherein the camera is configured to image a reference, wherein the reference is at a known location; and electronics configured to: determine the position of the machine in three dimensions using data from the robotic total station; determine the offset between the rotor and the stator measured by the angle sensor, wherein the offset is determined by a position of the rotor while the camera images the reference; and calculate the heading of the machine based on the offset and the known location of the reference. In some embodiments, the system further comprises a retroreflector coupled with the machine and the robotic total station is configured to track the retroreflector to track the machine; and/or the robotic total station is configured to transmit the position of the machine to the electronics, and the electronics are coupled with the machine. In some embodiments, the reference is the robotic total station, an LED (Light Emitting Diode) light ring coupled with the robotic total station, or a fence post; and/or the camera has a field of view equal to or less than 20 degrees.

In some embodiments, a method for determining 3D position and heading of construction equipment comprises: determine a position of a machine in three dimensions using a total station; create an image of a reference with a camera, wherein: the reference is at a known location; the camera is on a rotor; the rotor is configured to move about a stator; measure an offset between the stator and the rotor at a time the image of the reference is created; calculate the heading of the machine based on the offset and the known location of the reference.

In some embodiments, a system for determining 3D position and heading of construction equipment comprises: a machine for use at a construction site, wherein: the machine is movable so as to have a first degree of freedom, a second degree of freedom, a third degree of freedom, and a fourth degree of freedom; the first degree of freedom, the second degree of freedom, and the third degree of freedom correspond to a position of the machine, in three dimensions; the fourth degree of freedom corresponds to a heading of the machine; a retroreflector coupled with the machine; a robotic total station, configured to track the retroreflector and determine the position of the retroreflector in three dimensions; a light source at a known location; an orientation device, wherein: the orientation device is coupled with the machine; and the orientation device comprises a plurality of cameras, wherein each camera of the plurality of cameras has an image sensor; and electronics configured to: determine the position of the machine in three dimensions using data from the robotic total station; determine a coordinate of the light source imaged on an image sensor of the plurality of cameras; calculate the heading of the machine based the coordinate of the light source imaged on the image sensor and the known location of the light source. In some embodiments, the light source is coupled with the robotic total station; the light source is a laser or an infrared light; and/or the plurality of cameras provide a combined 360 degree field of view. In some embodiments, the orientation device comprises a rotor. In some embodiments, the orientation device comprises only one image sensor and/or the image sensor tracks the reference.

In some embodiments, a method for determining 3D position and heading of construction equipment comprises: determining a position of a machine in three dimensions in a first coordinate system using a total station; creating reate an image of a reference with a camera, wherein: the reference is at a known location in the first coordinate system; the camera is one of a plurality of cameras; determining a coordinate of the reference in a field of view of the camera in a second coordinate system; determining an offset between the coordinate of the reference and a heading of the machine at a time the image of the reference is created; and calculating the heading of the machine in the first coordinate system based on the offset and the known location of the reference.

While the principles of the disclosure have been described above in connection with specific apparatuses and methods, it is to be clearly understood that this description is made only by way of example and not as limitation on the scope of the disclosure.

A number of variations and modifications of the disclosed embodiments can also be used. For example, in a warehouse using a fork lift, in a greenhouse for a robot to water plants. Elements of the first system, the second system, and the third system can be rearranged between systems.

What is claimed is:

1. A system for determining 3D position and heading of construction equipment, the system comprising:
   a machine for use at a construction site, wherein:
      the machine is movable so as to have a first degree of freedom, a second degree of freedom, a third degree of freedom, and a fourth degree of freedom;
      the first degree of freedom, the second degree of freedom, and the third degree of freedom correspond to a position of the machine, in three dimensions; and
      the fourth degree of freedom corresponds to a heading of the machine;
   a retroreflector coupled with the machine;
   a robotic total station, configured to track the retroreflector and determine the position of the retroreflector in three dimensions;
   an orientation device, wherein:
      the orientation device is coupled with the machine; and
      the orientation device comprises an image sensor;
   electronics configured to:
      determine the position of the machine in three dimensions using data from the robotic total station;
      determine a coordinate of a reference imaged on the image sensor, wherein the reference is at a known location; and
      calculate the heading of the machine based on the coordinate of the reference imaged on the image sensor and the known location of the reference.

2. The system as recited in claim 1, wherein the reference is a light source.

3. The system as recited in claim 2, wherein the light source is coupled with the robotic total station.

4. The system as recited in claim 2, wherein the light source is a laser or an infrared light.

5. The system as recited in claim 1, wherein the orientation device comprises a plurality of cameras and the image sensor is one of many image sensors.

6. The system as recited in claim 5, wherein the plurality of cameras provide a combined 360 degree field of view.

7. The system as recited in claim 1, wherein:
the orientation device comprises:
 a stator;
 a rotor;
 a motor to move the rotor in relation to the stator; and
 an angle sensor to measure an offset between the stator and the rotor; and
the heading is calculated based on the offset between the stator and the rotor.

8. The system as recited in claim 1, wherein the robotic total station uses a first coordinate system and the image sensor uses a second coordinate system.

9. The system as recited in claim 1, wherein:
the image sensor is part of a camera; and
the camera has a field of view equal to or less than 20 degrees.

10. A method for determining 3D position and heading of construction equipment, the method comprising:
determining a position of a machine in three dimensions in a first coordinate system using a total station;
creating an image of a reference with a camera, wherein the reference is at a known location in the first coordinate system;
determining a coordinate of the reference in a field of view of the camera in a second coordinate system;
determining an offset between the coordinate of the reference and a heading of the machine; and
calculating the heading of the machine in the first coordinate system based on the offset and the known location of the reference.

11. The method as recited in claim 10, wherein the camera is part of a plurality of cameras.

12. The method as recited in claim 11, wherein the plurality of cameras provide a combined 360 degree field of view.

13. The method as recited in claim 10, wherein the reference is a light source.

14. A system for determining 3D position and heading of construction equipment, the system comprising:
a retroreflector for coupling to a machine;
a robotic total station, configured to track the retroreflector and determine a position of the retroreflector in three dimensions;
an orientation device for coupling to the machine, wherein the orientation device comprises an image sensor; and
electronics configured to:
 receive data from the robotic total station;
 determine the position of the machine in two dimensions or three dimensions using the data from the robotic total station;
 determine a coordinate of a reference imaged on the image sensor, wherein the reference is at a known location; and
 calculate a heading of the machine based on the coordinate of the reference imaged on the image sensor and the known location of the reference.

15. The system as recited in claim 14, wherein the electronics are part of the orientation device.

16. The system as recited in claim 14, wherein the reference is the robotic total station, an LED light ring coupled with the robotic total station, or a fence post.

17. The system as recited in claim 14, wherein:
the orientation device comprises only one image sensor;
the image sensor is part of a camera; and
the camera has a field of view equal to or less than 20 degrees.

18. The system as recited in claim 17, wherein:
the orientation device further comprise a stator, a rotor, and a motor to move the rotor in relation to the stator;
the image sensor is coupled with the rotor; and
the electronics control the motor to move the rotor so that the image sensor tracks the reference.

19. The system as recited in claim 14 the system further comprising the machine, wherein:
the machine is configured for use at a construction site;
the machine is movable so as to have a first degree of freedom, a second degree of freedom, a third degree of freedom, and a fourth degree of freedom;
the first degree of freedom, the second degree of freedom, and the third degree of freedom correspond to the position of the machine, in three dimensions; and
the fourth degree of freedom corresponds to the heading of the machine.

20. The system as recited in claim 14, wherein:
the orientation device comprises a plurality of cameras and the image sensor is one of many image sensors; and
the plurality of cameras provide a combined 360 degree field of view.

* * * * *